(12) United States Patent
Bosch

(10) Patent No.: US 9,920,778 B2
(45) Date of Patent: Mar. 20, 2018

(54) VALVE FOR THE TEMPERATURE-DEPENDENT CONTROL OF AT LEAST ONE HYDRAULIC LOAD

(71) Applicant: HYDAC DRIVE CENTER GmbH, Langenau (DE)

(72) Inventor: Ralf Bosch, Boerslingen (DE)

(73) Assignee: HYDAC DRIVE CENTER GMBH, Langenau (DE)

(*) Notice: Subject to any disclaimer, the term of this patent is extended or adjusted under 35 U.S.C. 154(b) by 372 days.

(21) Appl. No.: 14/648,929

(22) PCT Filed: Dec. 21, 2013

(86) PCT No.: PCT/EP2013/003936
§ 371 (c)(1),
(2) Date: Jun. 2, 2015

(87) PCT Pub. No.: WO2014/106535
PCT Pub. Date: Jul. 10, 2014

(65) Prior Publication Data
US 2015/0308468 A1 Oct. 29, 2015

(30) Foreign Application Priority Data

Jan. 4, 2013 (DE) .................. 10 2013 000 121

(51) Int. Cl.
*F15B 21/04* (2006.01)
*F01P 7/00* (2006.01)
(Continued)

(52) U.S. Cl.
CPC ............ *F15B 21/042* (2013.01); *F04D 25/02* (2013.01); *F04D 27/004* (2013.01); *G05D 23/02* (2013.01)

(58) Field of Classification Search
CPC .................. G05D 23/02; F15B 21/042; F15B 2211/41563; F15B 2211/421;
(Continued)

(56) References Cited

U.S. PATENT DOCUMENTS 3,359,831 A * 12/1967 Scheiter .................. F01P 7/046
123/41.12
3,913,831 A * 10/1975 Talak ...................... F01M 5/007
137/625.29
(Continued)

FOREIGN PATENT DOCUMENTS

DE          34 07 747 A1    9/1985
DE          196 01 376 A1   7/1997
(Continued)

OTHER PUBLICATIONS

DE102010007247 Espacenet Machine Translation.*

*Primary Examiner* — Thomas E Lazo
*Assistant Examiner* — Dustin T Nguyen
(74) *Attorney, Agent, or Firm* — Wenderoth, Lind & Ponack, L.L.P.

(57) ABSTRACT

A valve (10) for the temperature-dependent control of at least one hydraulic load includes a valve housing (12) with a tank connection (T), a working connection (A), and a supply connection (P). A control piston (30) controls the connections (A, P, T), is moveable in the valve housing (12) and is preloaded by a working spring (74). A thermal element (62) can be supplied with a fluid at a specifiable temperature ($T_{Fluid}$) and is actively coupled to the control piston (30). The control piston can be moved by control pressure present at the supply connection (P). The thermal element (62) interacts with the working spring (74) such that the thermal element causes a temperature-dependent change of the preload force acting on the control piston (30).

26 Claims, 9 Drawing Sheets

(51) Int. Cl.
    *F04B 49/00*     (2006.01)
    *F04D 25/02*     (2006.01)
    *F04D 27/00*     (2006.01)
    *G05D 23/02*     (2006.01)

(58) Field of Classification Search
    CPC .. F15B 2211/428; F04D 25/02; F04D 27/004;
                            F04D 25/04; F01P 7/044
    USPC ........... 417/212, 213; 60/445, 450, 452, 462
    See application file for complete search history.

(56) References Cited

U.S. PATENT DOCUMENTS

| | | | | |
|---|---|---|---|---|
| 4,062,329 | A * | 12/1977 | Rio ......................... | F01P 7/044 |
| | | | | 123/41.12 |
| 4,488,680 | A * | 12/1984 | Itoh ...................... | F16K 31/002 |
| | | | | 236/100 |
| 4,699,571 | A * | 10/1987 | Bartholomaus ......... | F04B 49/08 |
| | | | | 417/213 |
| 5,800,130 | A * | 9/1998 | Blass .................... | F04B 49/002 |
| | | | | 417/213 |
| 5,876,185 | A * | 3/1999 | Schimpf ................. | F04B 49/08 |
| | | | | 417/212 |
| 6,820,817 | B2 * | 11/2004 | Leu ........................ | F01P 7/167 |
| | | | | 236/100 |
| 9,441,744 | B2 * | 9/2016 | Sheppard ............... | F01M 5/007 |

FOREIGN PATENT DOCUMENTS

| | | | |
|---|---|---|---|
| DE | 10 2010 007 247 A1 | 8/2011 | |
| DE | 102010007247 | * 8/2011 | .... F15B 2211/20553 |

* cited by examiner

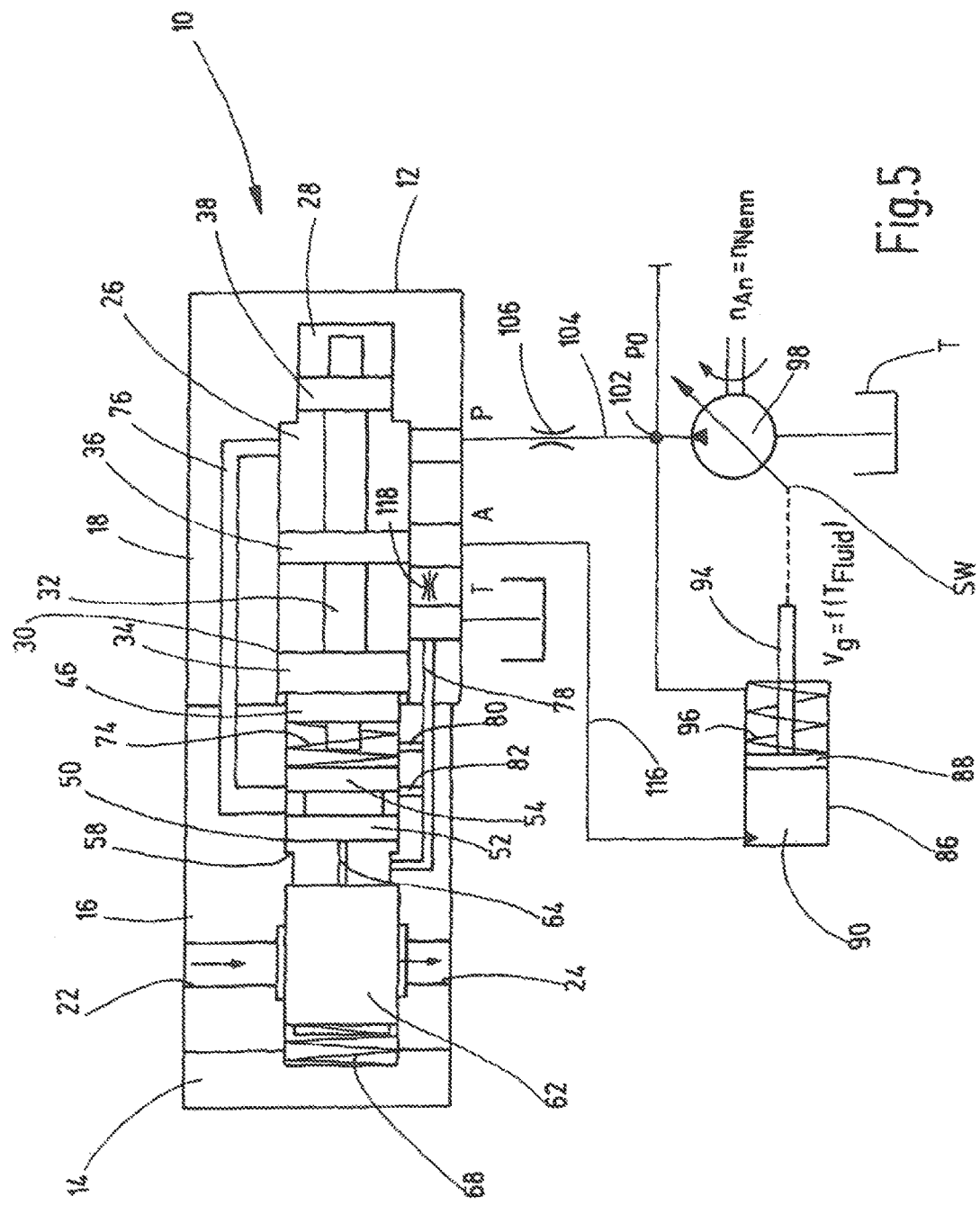

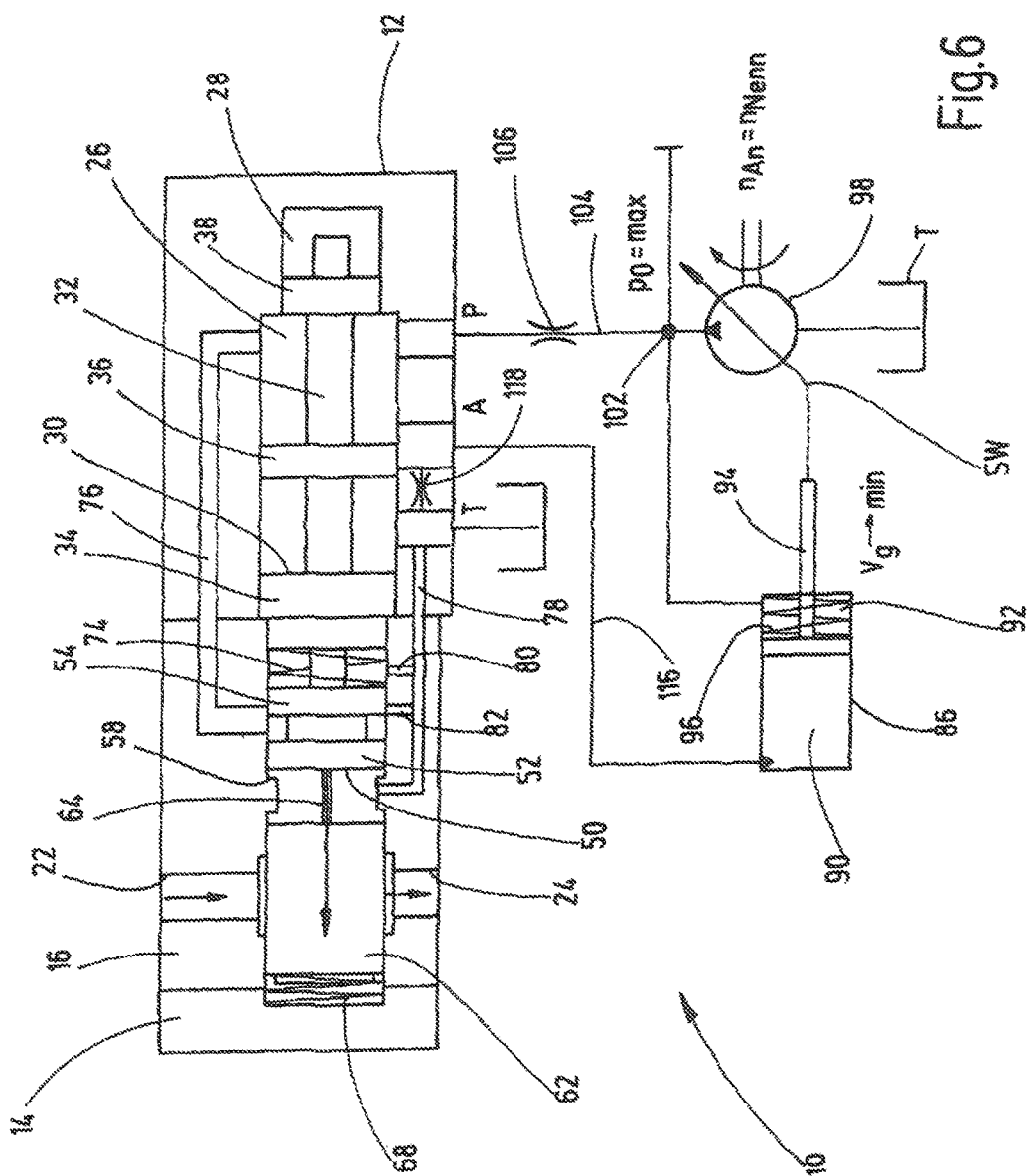

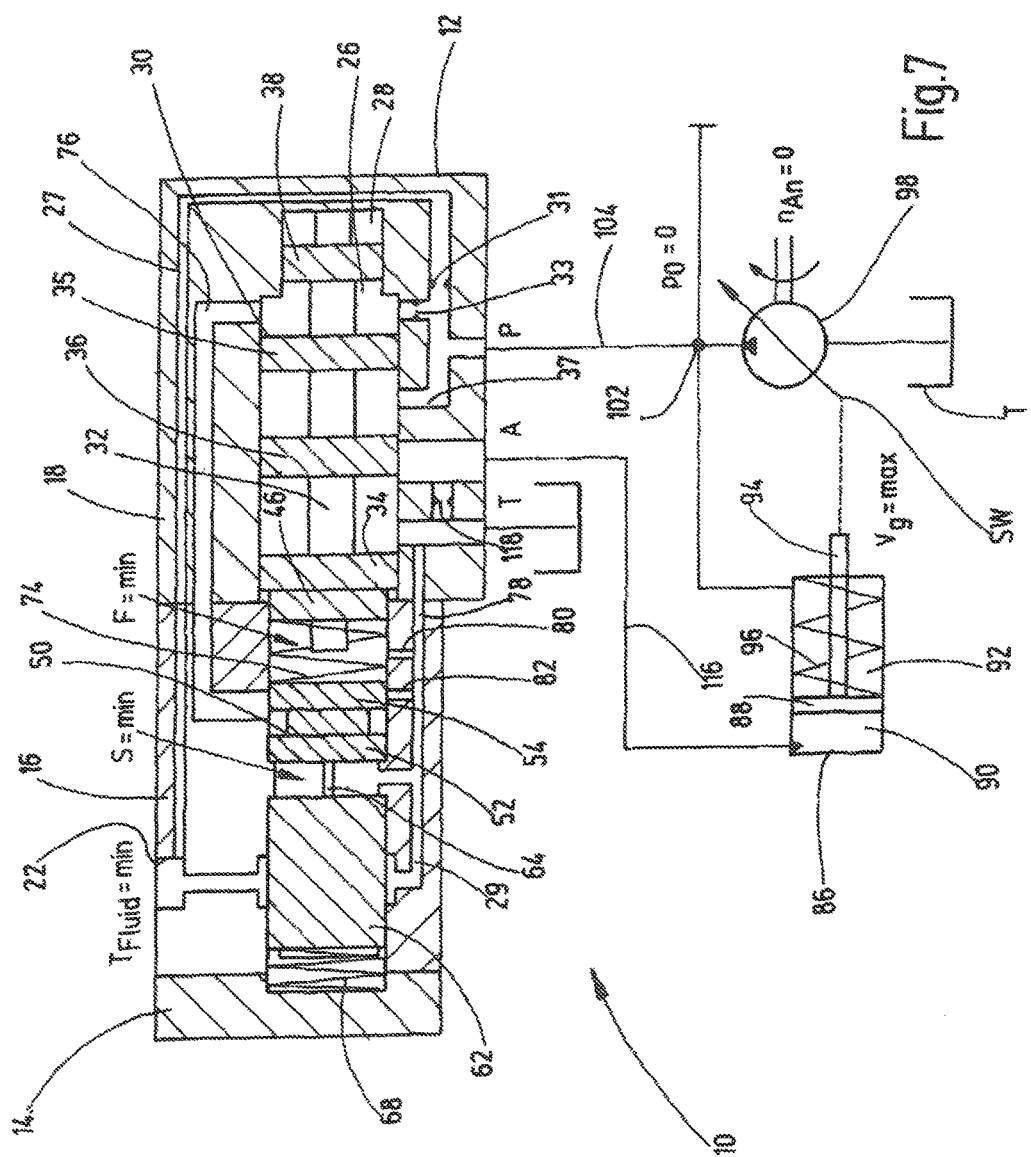

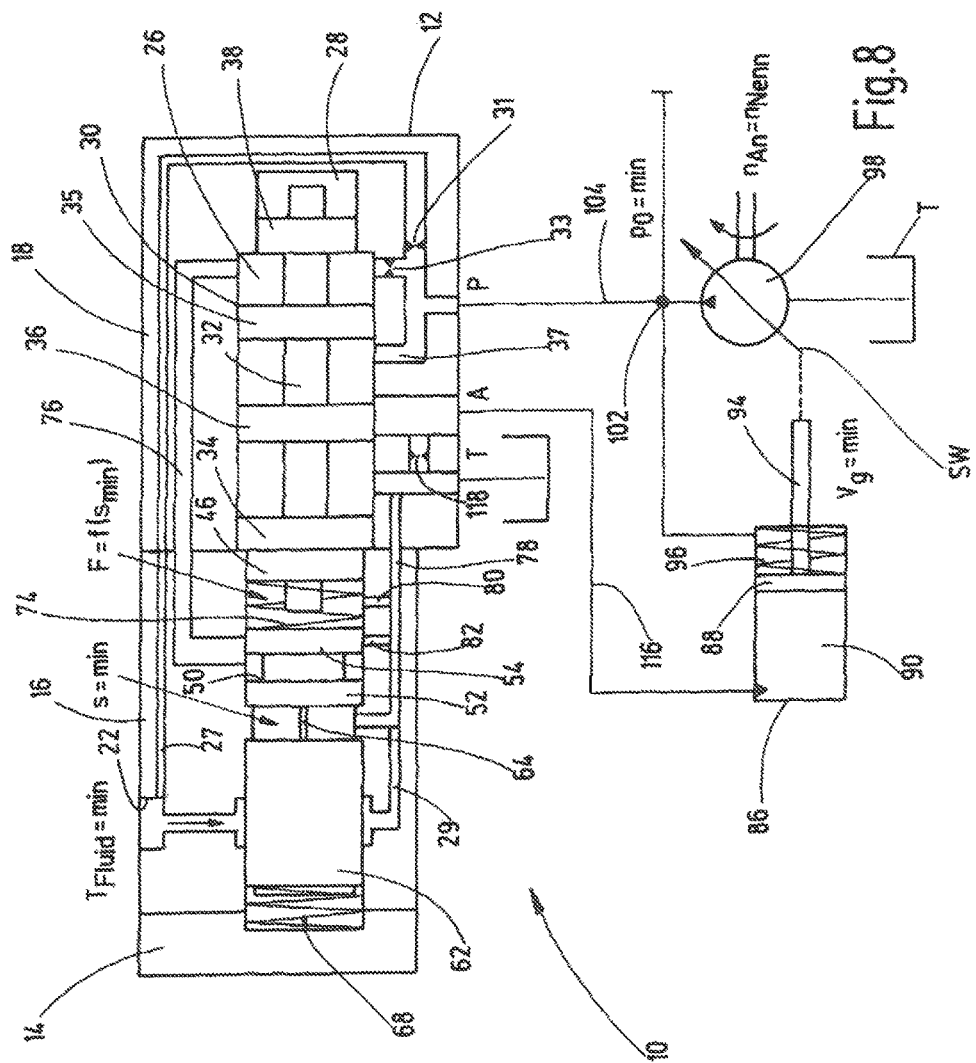

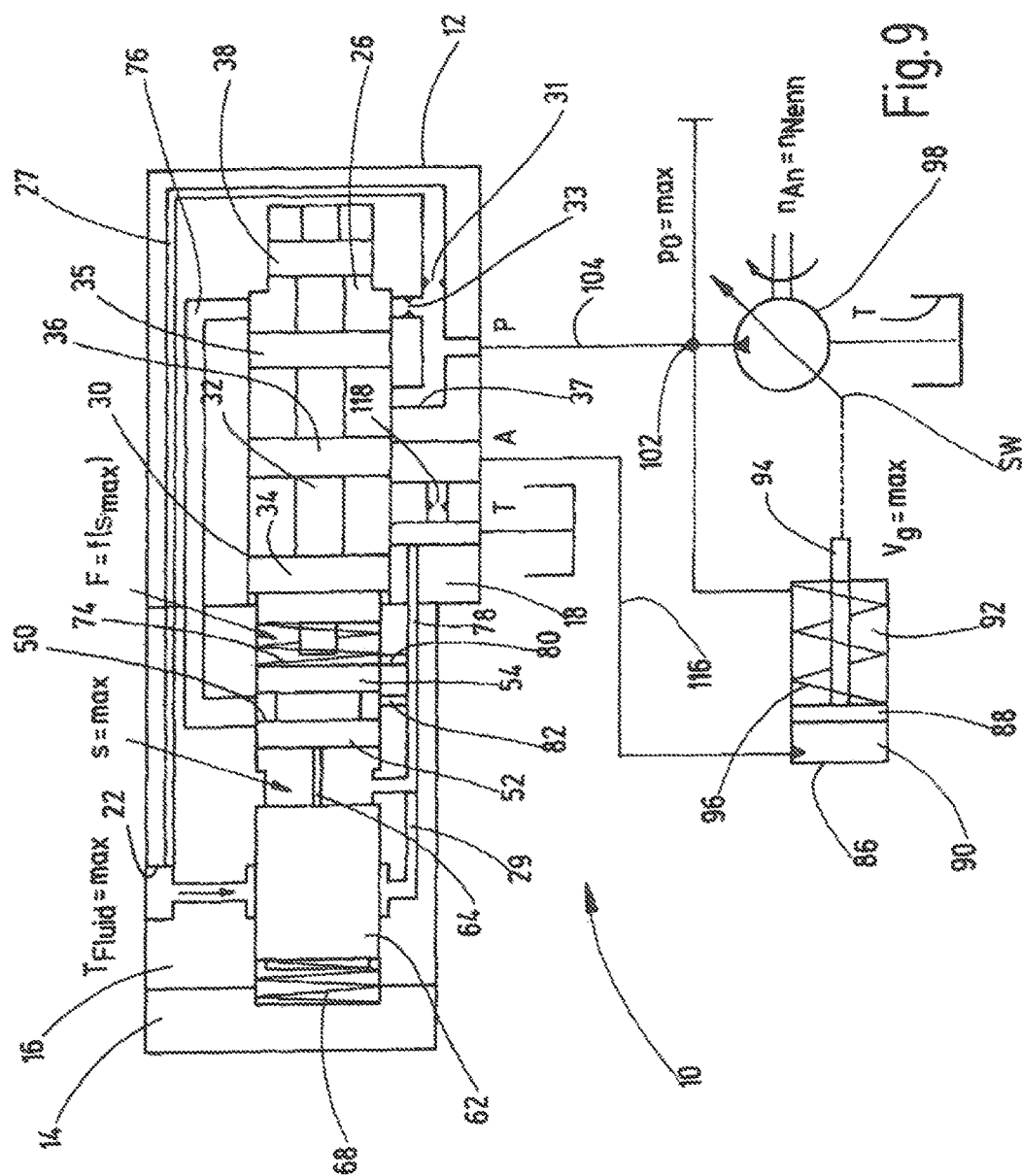

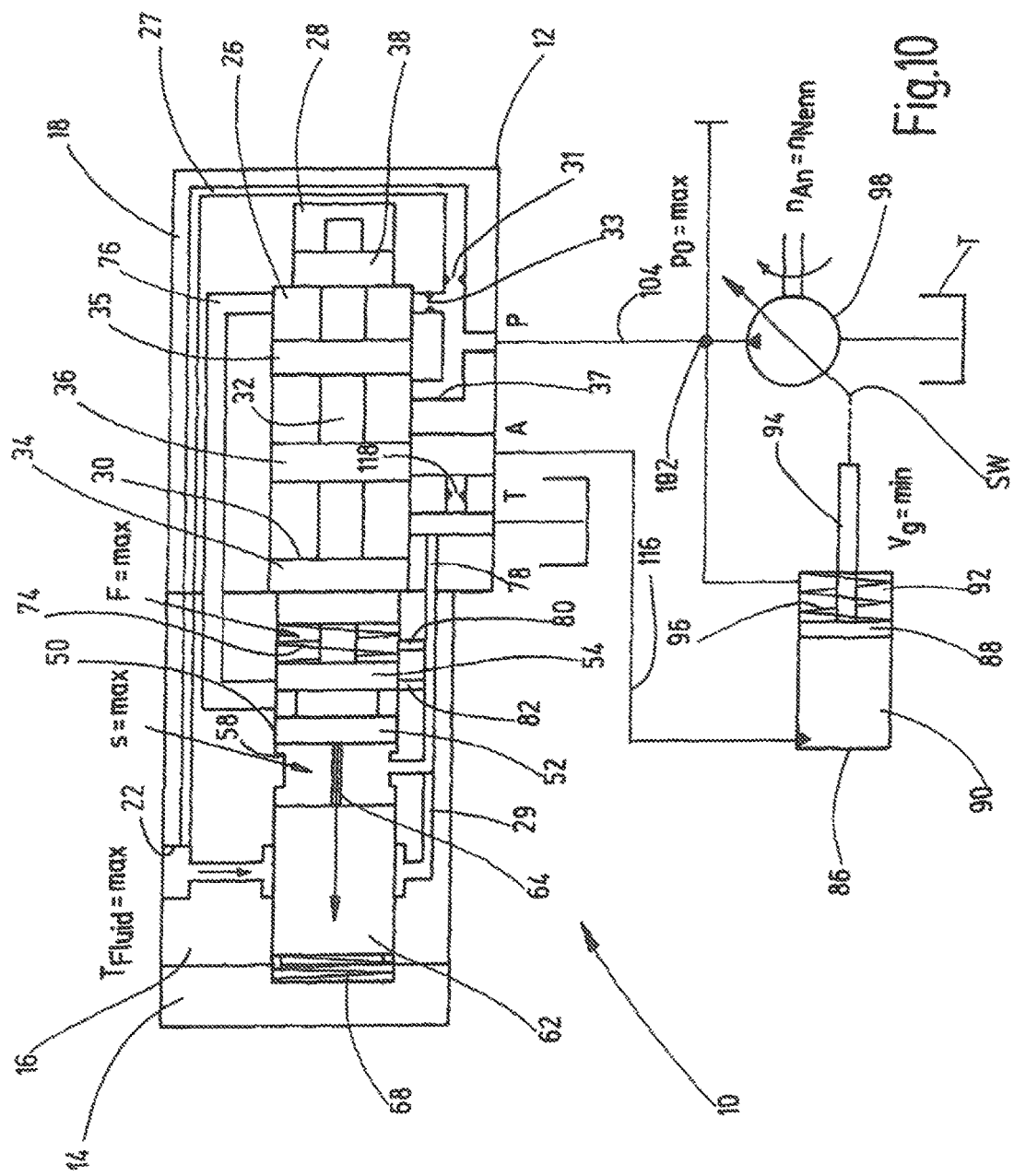

VALVE FOR THE TEMPERATURE-DEPENDENT CONTROL OF AT LEAST ONE HYDRAULIC LOAD

FIELD OF THE INVENTION

The invention relates to a valve for the temperature-dependent control of at least one hydraulic load. The valve comprises a valve housing having at least one tank connection, at least one working connection and at least one supply connection and comprises a control piston for controlling those connections. The control piston is movably disposed in the valve housing and preloaded by an energy store, such as a working spring. A thermal element can be supplied with a fluid at a specifiable temperature, and is actively coupled with the control piston. Furthermore, the invention relates to a hydraulic system, which contains at least one such valve.

BACKGROUND OF THE INVENTION

Energy is converted and transported in hydraulic systems, and losses occur in this conversion of energy and transport of energy. As such, mechanical and hydraulic energy is thereby converted into heat. The object of a cooling device is to dissipate this heat from the hydraulic system. The fan of a cooling device can typically be driven hydraulically. The hydraulic drive unit for an allocated hydraulic motor may be designed as a separate circuit, which is independent of the circuit of the fluid that is to be cooled.

A valve of the above mentioned type is known from the subsequently published DE 10 2012 008 480.3. The known valve is used to actuate a hydraulic drive of a fan as a function of the temperature of the fluid that is to be cooled, or more precisely, to predetermine the speed of the fan. The valve and the fan drive, which is actuated by the valve, are disposed in a joint hydraulic circuit. Room for improvement still exists in the use of the known valve in sluggish hydraulic systems having more limited adjustment dynamics. In addition, limiting the control pressure predetermined by the valve is desirable to be able to protect the thermal element against overloads.

SUMMARY OF THE INVENTION

An object of the invention is to expand the area of application for the valve, in particular to include sluggish hydraulic systems having more limited adjustment dynamics, and to make additional functions available to the valve to improve the manner in which the valve operates.

This object is basically achieved according to the invention by a valve where the thermal element and the control piston are two separate components and may be disposed in the valve housing in a joint fluid chamber. The fluid, for example a medium that is to be cooled, flows onto, about or through the thermal element, also referred to as the thermal working element, and takes on the temperature of the thermal working element. As the temperature of the fluid increases, the thermal element causes a movement, compression or expansion, of the energy store. Accordingly, a change in the initial load on the energy store predetermines the pressure that is to be regulated by the control piston, also referred to as the main control piston. By using the energy store, which is typically designed as a compression spring, thus as a working spring, a valve according to the invention, in particular, can be used for the regulation of sluggish hydraulic systems having more limited adjustment dynamics. However, the solution according to the invention is absolutely usable for highly dynamic applications as well.

In a preferred embodiment of the valve according to the invention, a choke piston, which can be moved in the valve housing, is disposed between the thermal element and the control piston. The choke piston is, in particular, connected to the thermal element in an operative connection on the one side, preferably via an actuating element, and is connected to the energy store in an operative connection on the other side. The energy store is in an operative connection with the control piston at the end of the energy store that faces away from the choke piston. In particular, the energy store is connected to the choke piston. An actuating element, for example a push rod, is advantageously formed on the thermal element, which actuating element generates a movement in a working direction, also referred to as an travel distance, with a simultaneous increase of force at the choke piston as the temperature of the fluid increases. Stated more precisely, the actuating element advantageously rests against the choke piston and moves the choke piston in accordance with its temperature-dependent travel distance. The travel distance and the associated force are transferred to the energy store via the choke piston.

In addition, advantageously, a P-T fluid connection is formed in the valve housing from the supply connection to the tank connection. The P-T fluid connection can be controlled by the choke piston. The choke piston closes or at least partially opens the P-T fluid connection in accordance with a travel distance of the thermal element. The choke piston opens an increasing choke cross section from the supply connection to the tank connection over the travel distance, or in other words, over the movement of the thermal element. A P-A fluid connection from the supply connection to the working connection, at which the operating pressure that is to be regulated prevails, is typically formed on the control piston, which serves as the main control piston.

In a further preferred embodiment of the valve according to the invention, at least one input choke is provided, which is allocated to the supply connection, and which is preferably disposed in at least one fluid arm in the valve housing allocated to the supply connection. The pressure differential across the input choke is increased in accordance with an increasing choke cross section of the choke piston. The system pressure in the hydraulic system allocated to the hydraulic load must increase disproportionately to maintain a balance of forces at the control piston. For this reason, a linear pressure-temperature characteristic curve can be adapted to the required characteristic curve of a load, for example, a disproportionately increasing characteristic curve of a fan, such as the cube thereof.

Advantageously, the thermal element can be in an operative connection with an overload element, such as an overload spring, preferably with a compression spring, at the end of the thermal element that is facing away from the control piston. In particular, the thermal element can be connected to the overload element. The overload element limits the initial load or, respectively, the force applied to the control piston via the energy store. In this way, a kind of pressure limitation is implemented in such a way that, in the case of a system pressure that exceeds the maximum allowable value, the control piston is brought into full contact with the thermal element via the choke piston, and the pressure that is to be regulated exerts a force on the overload element at the thermal element. The pressure that is to be regulated is limited to the value that is predetermined by the overload element, and as a result, the thermal element is protected against an overload.

With respect to the design of the control piston of the valve, advantageously the control piston has a main piston component and a second piston component as differential pistons on a joint piston rod. The second piston component has a different effective piston surface as compared to the main piston component. Between the two piston components a first fluid chamber is delimited, into which the supply connection discharges. The main piston component controls the outlet cross-section between the first fluid chamber and the working connection with control edges or control notches.

In addition, a connection line from the first fluid chamber to the choke piston, as well as a branch line, which runs from the choke piston to the tank connection, may also be present in the valve housing. The fluid passage between the connection line and the branch line can be controlled by the choke piston.

In addition, when a fluid path is formed between external fluid ports in the valve housing for the fluid, which fluid defines the temperature at the thermal element, and when the thermal element is disposed in this fluid path, this situation gives rise to the possibility that the valve can operate self-sufficiently, which is to say, without external fluid lines. In addition, advantageously a fluid return that extends from the thermal element to the tank connection can be provided and preferably also extends in the valve housing. The fluid feed and the fluid return form an internal flushing fluid channel for subjecting the thermal element to a thermal load.

Alternatively, a fluid path may be formed between external fluid connections in the valve housing for the fluid, which fluid defines the temperature of the thermal element. The thermal element is disposed in the fluid path. In the case of this alternative, an external fluid port is use, wherein the fluid or, respectively, the flushing fluid is not returned internally via the valve or, respectively, pump housing, but instead, is returned externally.

Regardless of the way in which the application of the fluid or, respectively, the application of the thermal load to the thermal element is configured, at least one external fluid port, which is allocated to the thermal element, may be formed in the valve housing.

The invention also relates to a hydraulic system having at least one hydraulic load and at least one valve according to the invention for the temperature-dependent control of the at least one hydraulic load. The hydraulic load is connected to the working connection of the valve. The control piston at least partially opens or closes a P-A fluid connection from the supply connection to the working connection according to the temperature of the thermal element.

As such, at least one hydraulic load may be allocated to a hydraulic motor, which, together with a variable displacement pump, forms a hydraulic system, in particular a motor pump unit. The respective hydraulic load influences the displacement volume of the variable displacement pump, and in particular, predetermines the swivel angle thereof, preferably via a back coupling of the operating pressure. In the preferred hydraulic system according to the invention, a temperature-dependent control of the hydraulic motor and, as a result, the motor power thereof, is implemented. Due to the function-related use of at least one or, advantageously, a plurality of springs, especially preferably, compression springs connected in series, a temperature-dependent regulation of a sluggish hydraulic system having more limited adjustment dynamics is achieved. In this embodiment of the hydraulic system according to the invention, the corresponding hydraulic load is advantageously designed as a actuating cylinder, which is connected to the working connection of the valve on the working side. The piston of said actuating cylinder predetermines the pivot angle of the variable displacement pump.

In a further preferred embodiment of the hydraulic system according to the invention, the hydraulic motor drives a fan of a cooling device having a fan speed, which is predetermined by the hydraulic system.

As such, according to the invention, an axial piston pump having an integrated temperature control valve is provided as a fan drive without the use of electrical or electronic components.

According to the invention, the above-specified features and the features presented below may be implemented individually, or in any combination thereof.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic not to scale:

FIG. 5 is a more simplified side view in section, as compared to FIG. 1, which shows the first exemplary embodiment in the active operating state, in which the fluid that is to be cooled is warm;

FIG. 6 is a more simplified schematic side view in section, as compared to FIG. 1, which shows the first exemplary embodiment in the operating state of the pressure cut-off in the event of an overload;

FIG. 7 is a side view in section of a valve according to a second exemplary embodiment of the valve according to the invention, as well as a symbolic diagram of the hydraulic system associated therewith, wherein the inactive operating state is shown;

FIG. 8 is a more simplified schematic side view in section, as compared to FIG. 7, of the valve of the second exemplary embodiment, wherein the active operating state in which the fluid is cold is depicted;

FIG. 9 is a more simplified side view in section, as compared to FIG. 7 of the valve of the second exemplary embodiment, wherein the active operating state in which the fluid that is to be cooled is warm is shown; and FIG. 10 is a more simplified schematic side view in section, as compared to FIG. 7, of the valve of the second exemplary embodiment, wherein the operating state is depicted having a pressure cut-off in the event of an overload.

DETAILED DESCRIPTION OF THE INVENTION

Figure 1:
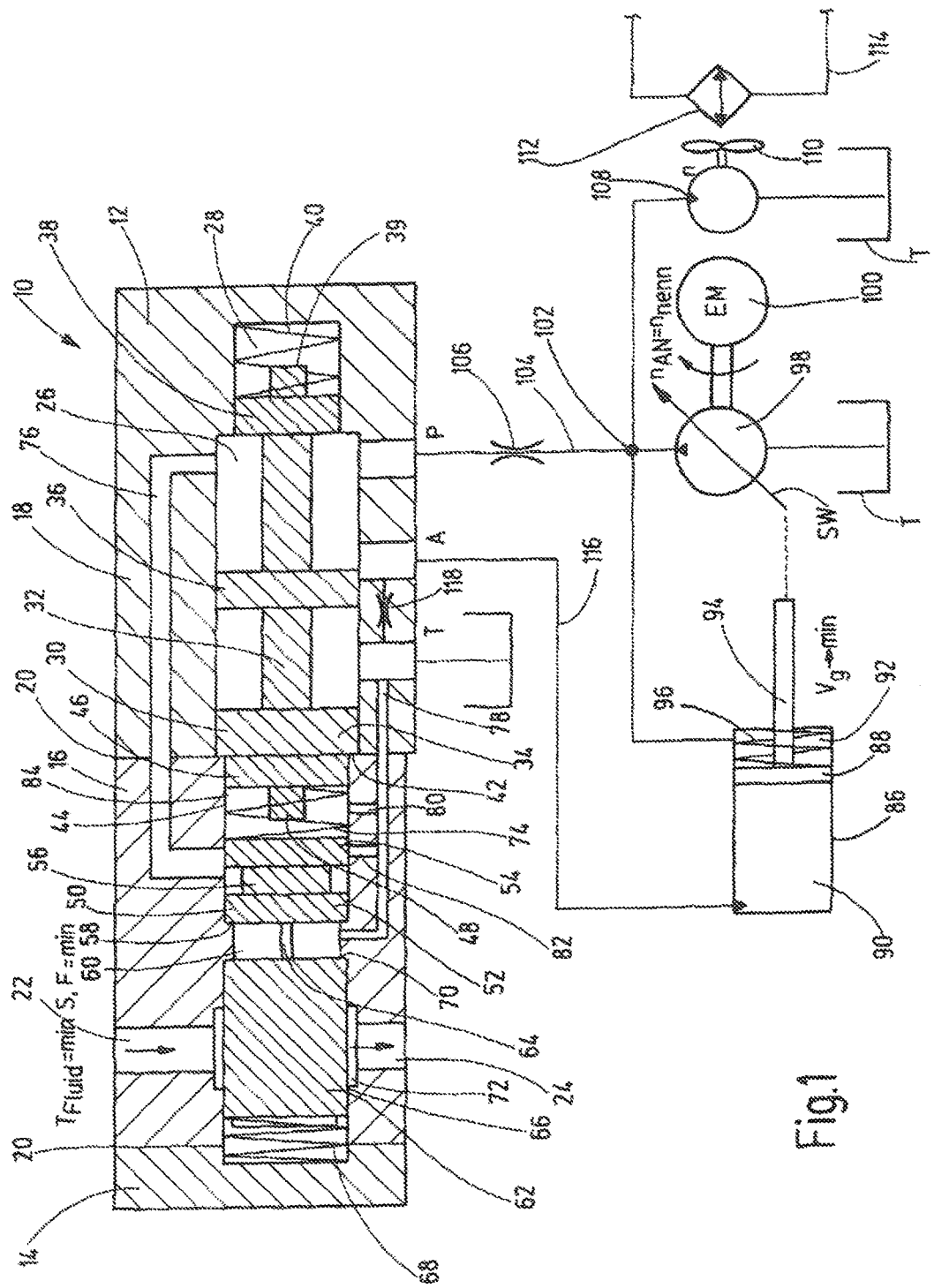
FIG. 1 a side view in section of a valve according to a first embodiment of the invention, as well as a symbolic diagram of a hydraulic system associated therewith, wherein the system is depicted in the active operating state in which the fluid is in a cold state.

FIG. 1 shows, shows, in part, a sectional view, and in part, a symbolic depiction of a first exemplary embodiment of the valve solution according to the invention. The valve 10 has a valve housing 12 made up of three parts 14, 16 and 18 allowing a practical assembly of the valve housing 12 along corresponding vertically extending separation points 20. With respect to a simplified depiction, the connectivity solution is not shown in detail. As viewed looking towards the valve 10 according to FIG. 1, a supply or pump connection P, a working connection or utility connection A, as well as a tank connection T are located on the underside of the valve housing 12, which tank connection has a tank or ambient pressure.

In addition, two fluid ports or connections 22, 24 are present on the left side of the valve housing part 16 as viewed in the direction shown in FIG. 1. Through those fluid ports 22, 24 a fluid, for example in the form of a hydraulic oil, can flow in the direction indicated by the arrow.

Two fluid chambers 26, 28, which are disposed one behind the other, are present within the valve housing part 18 in the longitudinal direction thereof. A control piston 30, which can be movably guided in a longitudinal direction, is present in the two fluid chambers 26, 28 and within the inner surface of the valve housing 12. According to the depiction in FIG. 1, three piston components 34, 36 and 38 are present on the piston rod 32 of that control piston, which piston components are spaced apart from one another in an axial direction, and are wider than the piston rod 32 in the radial direction. The two annular or cylindrically-shaped piston components 34, 36 have the same outer circumference. The piston component 38, by contrast, has a diameter that is reduced accordingly, so that piston component 38 is able to move in the fluid chamber 28. The outer circumference of fluid chamber 28 is likewise reduced accordingly with respect to the fluid chamber 26. The fluid chamber 28 forms a spring chamber, in which an energy store in the form of a compression spring 40 is held. The solution according to the invention may also omit the compression spring 40.

According to the depiction in FIG. 1, the right side of the piston rod 32 projects axially over or beyond the piston component 38, in this respect, the piston rod forms a stop surface 39 at the free front surface thereof for possible contact with the aligned inner surface of the valve housing 12 at this location. On the opposite side, however, the piston rod 32 transitions directly into the piston component 34. According to the depiction in FIG. 1, which corresponds to the valve solution in a cold operating state, the piston component 34 rests against a limit stop 42, which is designed in such a way that a further fluid chamber 44 is formed, having a smaller diameter than the adjacent fluid chamber 26. In this respect, a sudden change in diameter in the valve housing part 16 forms a step with respect to the valve housing part 18 at the specified separation point 20. Separation point 20 extends vertically and serves as a limit stop 42 for the entire control piston 30 insofar as the control piston is located in the left stop position thereof as shown in FIG. 1.

An additional piston component 46 adjoins the left piston component 34 of the control piston 30. Piston component 46 is reduced in diameter accordingly with respect to piston component 30 such that it can be movably guided in a longitudinal direction in the additional fluid chamber 44. In the first exemplary embodiment presently shown, the additional piston component 46 is an integral component of the piston component 30 and is reduced in diameter along a step 20. The piston rod 32 could also carry through, and for the two piston components 38 and 46 to be designed such that they are integral to one another. As viewed in the direction shown in FIG. 1, the additional piston component 46 has a stop element 48 on the left side thereof, which can stop element be brought into abutment with a stop surface on the front surface of a choke piston 50 as a function of the movement positions of the piston assembly within the valve housing. The choke piston 50 can be movably guided in a longitudinal direction within the fluid chamber 44 and has two annular piston components 52, 54, which, as viewed in the axial direction, are held spaced apart from one another via a piston rod component 56, which is disposed therebetween. That choke piston 50 is preferably integrally formed.

When the valve assembly shown in FIG. 1 is in the cold operating state, the choke piston 50 rests with the free front surface of the left piston 52 thereof against an additional limit stop 58. Stop 58 is created by a reduction in diameter of a fourth fluid chamber 60, which, as viewed in the axial direction of the piston assembly, is delimited on the right side thereof by the front surface of the piston component 52 of the choke piston 50, and which is delimited on the other, opposite side thereof by a thermal element 62. Furthermore, an actuating element 64 passes through the fourth fluid chamber 60, as viewed in the axial direction of the valve 10, which actuating element 64 is associated with a thermal element 62.

The thermal element 62 is received in an element receptacle 66 within the valve housing part 16. The thermal element 62 is able to move, contrary to the action or against the biasing force of an additional energy store in the form of an additional compression spring 68, to the left, as viewed in the direction shown in FIG. 1, as a function of the operating state of the valve 10. The thermal element 62 is then spaced at the right, front end surface thereof at a distance from a stop surface 70, which will be described in greater detail below. Otherwise, the additional compression spring 68 is supported at one free end thereof on the thermal element 62 and at the other free end thereof on the interior of the valve housing part 14, which closes off the valve housing 12 from the outside in the manner of an end cap. In addition, the thermal element 62 is enclosed by or surrounded by an annular chamber 72, into which the fluid ports 22, 24 discharge.

An additional, third energy store in the form of a compression spring extends between the choke piston 50 and the additional piston component 46, which third energy store is a working spring 74. As is further made clear in FIG. 1, the supply or pump connection P as well as the working connection A discharge is at least in part into the first fluid chamber 26 delimited at its edges or longitudinal ends by the two piston components 36, 38. The tank connection T, in turn, discharges into the first fluid chamber 26 in the region between the two piston components 34 and 36 of the control piston 30. A connection line 76 discharges between that part of the first fluid chamber 26 extending between the two piston components 36 and 38, extends through the valve housing 12 in the upper region thereof in a longitudinal direction, and discharges at its other end into the third fluid chamber 44 in that region of third fluid chamber 44 delimited by the two piston components 52 and 54 of the choke piston 50. However, depending on the structural configuration, the connection line 76 may, instead, be disposed in a rear region (not shown) of the valve housing 12. A further, second connection line 78 is provided on the underside of the valve housing 12, extends in an axial direction parallel to the connection line 76, discharges at one free end thereof into the tank connection T, and discharges at the other free end thereof into the fourth fluid chamber 60. In addition, transverse branch lines 80, 82 originate at the connection line 78. The branch line 80 discharges into the working spring chamber 84 in which the working spring 74 extends. The branch line 82 extends and opens in the direction of the third fluid chamber 44. When the valve is in the cold operating state according to the depiction in FIG. 1, the piston component 54 of the choke piston 50 completely covers said second branch line 82.

As is further shown in FIG. 1, an adjustment cylinder 86, which is designed as a differential cylinder, is connected to the valve 10, which will be explained in greater detail below. The piston 88 of the adjustment cylinder 86 separates a piston chamber 90 from a rod chamber 92 in a conventional manner within the cylinder housing such that this separation is fluid-tight. A return spring 96 is provided within the rod chamber 92, through which a control rod 94 passes. Control rod 94, in turn, is preferably actuated by the piston 88, as an integral component thereof. The return spring seeks to move the piston 88 in the direction of the unloaded state of the return spring, from right to left as viewed in FIG. 1. The control rod 94, which is designed as a piston rod, in conjunction with the adjustment or variable displacement cylinder, forms the adjusting device (pivot angle SW) of a variable displacement pump 98, which may be designed as an axial piston machine, for example. An electric motor 100 may serve as a drive for the variable displacement pump 98, which may be a fixed speed motor, but may also be a variable speed motor. Instead of an electric motor, another drive source may also be used. For the purpose of the functional description of the regulation, the pump is assumed to have a constant drive speed, although this drive speed is not necessarily a requirement in actual operation. The variable displacement pump 98 removes the hydraulic fluid from the tank T and can supply this fluid at the end thereof, via a junction point 102, in the direction of the pump connection P, and thus supplies fluid to a valve. A screen or choke 106 is connected in feed line 104 as a pressure differential or input choke. Starting at the junction point 102, the rod chamber 92 of the adjustment cylinder 86 is connected such that it can conduct fluid, and a hydraulic motor 108 is connected on the opposite side of the junction point 102, which motor serves as a fan drive and drives a fan blade 110 in the manner of a rotor. The fluid, which is transported from the variable displacement pump 98 through the hydraulic motor 108 then flows out on the tank side T. The volume of air flow, which is generated by the fan blade 110 in a conventional manner, flows through a heat exchanging device 112, which may be designed as a plate heat exchanger, for example, to which a hydraulic circuit 114 is connected. Hydraulic circuit 114 serves to actuate a hydraulic work device, which is not depicted in greater detail here, for example. In particular, the fan cools the fluid of the hydraulic circuit, which fluid is transported through the exchanging device 112 by an additional pump device, which is not depicted in greater detail here. The hydraulic circuit 114 may be connected on the input side to the first fluid port 22, and on the output side to the second fluid port 24, of the valve 10 via fluid passages, which are not depicted in greater detail here. The temperature in a separate fluid circuit can be reduced via the first and second fluid port 22 and 24, which circuit only indirectly reflects the operating temperature situation in the hydraulic circuit 114. In addition to these above-mentioned fluid passages, the piston chamber 90 of the adjustment cylinder 86 is connected to the working connection A via an additional connection line 116.

Before explaining the function of the valve solution shown in greater detail, for a practical function, the compression spring 40 in the second fluid chamber 28 may also be omitted. In a basic depiction, a damping choke 118 is connected in fluid communication between the utility connection A and the tank connection T within the valve housing 12. The fluid chamber 28 should be discharged towards the tank side T, which is not depicted.

Figure 4:
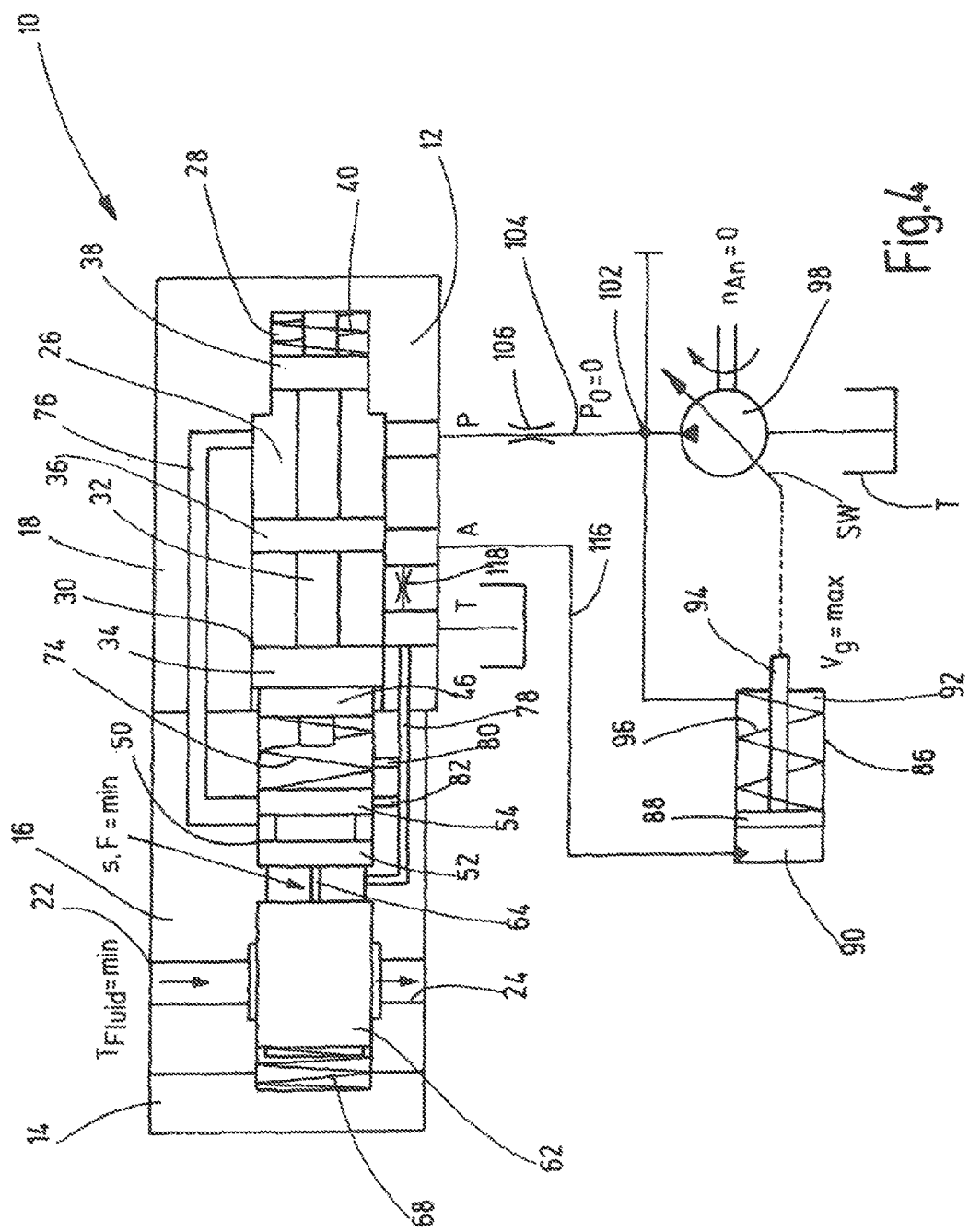
FIG. 4 is a more simplified schematic side view in section, as compared to FIG. 1, which shows the first exemplary embodiment in the inactive operating state.

To explain the manner of functioning, reference is first made to FIG. 4, which shows the valve 10 and the associated hydraulic system in an inactive operating state. As such, the system pressure is $p_{0=O}$, because when the drive motor or electric motor 100 is switched off, the drive speed of the actuating pump 98 $n_{An=O}$. As shown in FIG. 4, as such, the variable displacement pump 98 is adjusted to a full volume flow rate thereby, which is to say, the pivot angle SW of the variable displacement pump 98 is maximized. The control piston 30, which is designed as a differential area piston, is thereby held in the right-hand A-T position by the working spring 74, so that the working connection A, and thus the piston chamber 90, of the actuating cylinder 86 are connected to the tank connection T. Due to the tank connection to the piston chamber 90 that is created, the piston 88, which is guided in the actuating cylinder 90, is held in the position thereof that corresponds to the maximum pivot angle SW by the return spring 96. The return spring 96 need not be present in the actuating cylinder 86, since actuating systems can certainly be implemented without a spring return. Moreover, a permanent connection is between the working connection A and the tank connection T via the connection formed in the valve housing 12 via the damping choke 118. The travel distance S=min of the actuating element 64 of the thermal element 62 as well as the force F=min that is exerted on the choke piston 50 are minimized, optimally such that they equal zero, in accordance with the minimum temperature $T_{Fluid}$=min of the fluid. Consequently the position of the control piston 30 remains substantially unchanged as the A-T position thereof. On the side allocated to the thermal element 62, in an inactive operating state, the choke piston 50 lies at a limit stop 58 (see FIG. 4) in the form of a reduction in diameter in the interior of the valve housing 12.

If the system is brought from the inactive state into the active operating state, the variable displacement pump 98 is driven at a nominal speed $n_{AN}$. Due to the fact that the fluid is still cold, essentially no force $F=f(S_{min})$ is exerted on the choke piston 50 via the thermal element 62, so that this choke piston separates the connection lines 76 and 78 from one another via the closed control edge. The system pressure $p_0$, which builds up at the supply connection P is thus not lowered via the connection line 76, and therefore, is exerted at a specifiable intensity on the differential pressure surfaces of the control piston 30. Control piston 30 is moved against the working spring 74 by the total hydraulic force that arises, and as a result, the P-A connection is opened, as shown in FIG. 1. The volume flow rate, which results from the pressure gradient between the supply connection P and the working connection A, together with the adjustment piston 88, formed on the differential piston, exerts a force on the large piston surface. If this force exceeds the action of force of the annular piston surface, which is subjected to pressure on the side of the piston rod, and which is thus the smaller annular piston surface, the adjustment piston 88 is displaced in the direction of the end position thereof that is on the right as depicted in FIG. 1. As a result, the volume of the adjustment cylinder 86 on the side of the piston rod is initially brought to a minimum, whereby the displacement volume of the variable displacement pump 98 is first reduced to a minimum, in that the piston 88 of the actuating cylinder 86 modifies the pivot angle SW towards smaller values.

The self-adjusting system pressure $p_0$ substantially corresponds to the sum of the forces from the relatively weak preloaded working spring as well as the necessary actuating forces of the pump adjustment mechanism and ideally falls below the minimum pressure required by the driving hydraulic motor 108 to start up the fan 110. In the case of a fluid, which has a low temperature, the actuating element 64 of the thermal element 62 is at the minimum adjustment length thereof, which is to say, it is fully retracted. $F_{min}$ is the force that results from the minimum adjustment length, which force is exerted on the choke piston 50, and which can be assumed to be approximately zero, when the fluid is in a cold state, not otherwise specified. For the choke piston 50, this situation means that, in the case that the fluid is cold, the choke piston 50 does not change its position with respect to the position thereof in the inactive operating state according to FIG. 4, so that the lines 76 and 78 are separated from one another by the closed control edge, as described above. A change in the state only occurs as a result of an increase in temperature.

This state is depicted in FIG. 5. There is an increase in the travel distance of the thermal element 62 or, respectively, of the actuating element 64 thereof and a corresponding displacement of the choke piston 50 in accordance with the increasing temperature $T_{Fluid}$ of the fluid.

Figure 2:
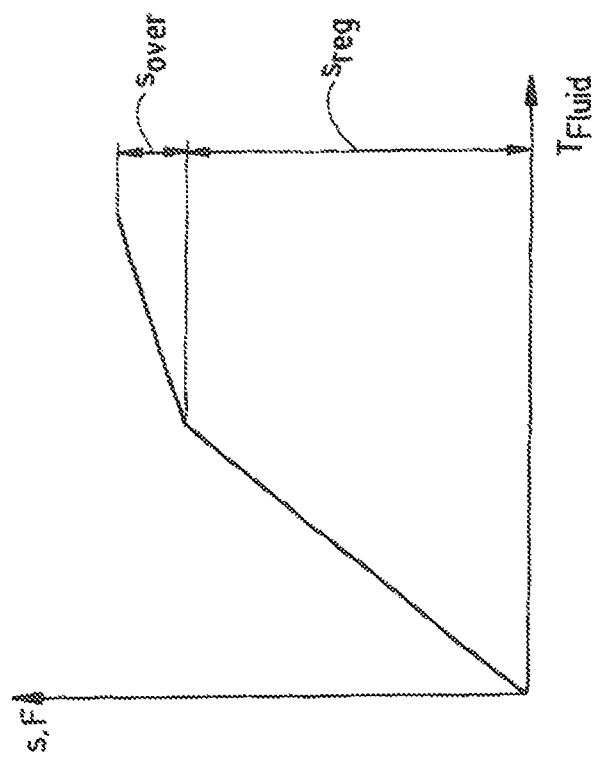
FIG. 2 is a travel distance-temperature graph of a thermal element as part of the valve according to the invention.

The travel distance-temperature graph of the thermal element 62 shown in FIG. 2 is intended to clarify the function of the thermal element 62, and shows a first range, having a regular travel distance $S_{reg}$, which increases with a first slope, here, nearly 1, in a linear manner with the temperature $T_{Fluid}$ of the fluid, and an adjoining second range with an irregular travel distance $S_{over}$, which increases with a second slope, which is reduced as compared to the first slope, in a linear manner with the temperature $T_{Fluid}$ of the fluid up to a maximum value. The regular travel distance $S_{reg}$ thereby corresponds to a movement of the thermal element 62 or the actuating element 64 thereof in the control range, and accordingly, the irregular travel distance $S_{over}$ corresponds to an excess movement of the thermal element 62 or the actuating element 64 connected thereto.

A displacement of the choke piston 50 occurs in accordance with the extension of the travel distance of the actuating element 64 of the thermal element 62, so that an increased initial load is exerted on the control piston 30 via the working spring 74. The increased force of the working spring 74 moves the control piston 30 in FIG. 5 to the right, as a result of which the control edge on the piston component 36 increasingly reduces the P-A fluid connection from the supply connection P to the working connection A and further, to the piston chamber 90 of the actuating cylinder 86. As a result, movement of the piston 88 of the actuating cylinder 86 increasingly increases the pivot angle SW of the variable displacement pump 98 to increase the displacement volume accordingly. At the same time, the choke piston 50 increasingly opens the connection between the connection line 76 and the second connection line 78, which extends to the tank connection T, using the control edge located on the piston component 54. As a result, the control pressure that is exerted upon the control piston 30 behind the input choke 106 in the fluid chamber 26 is lowered, which means that the system pressure $p_0$ that exists on the pressure side of the variable displacement pump 98 must increase disproportionately to maintain the balance of forces at the control piston 30. As is made clear in FIG. 3, what is actually a linear pressure-temperature characteristic curve is thereby made non-linear, and instead, is adapted to the increasing characteristic curve of the fan, which increases cubically (see FIG. 3). Here, the working point of the inactive system is indicated as I, the working point of the active system in the case that the fluid is cold, is indicated as II, and a working point within the control range in the case that the fluid is warm is indicated as III. As can be seen, as compared to a control pressure $P_1$, which corresponds to the linear pressure 50, an additional pressure $P_2$ is needed to maintain the control pressure prevailing in the control range due to the reduction in pressure via the choke piston 5. As the temperature of the fluid increases, there is a corresponding increase in the system pressure $P_0$ with a corresponding increase in the fan speed generated by the hydraulic motor 108.

Figure 3:
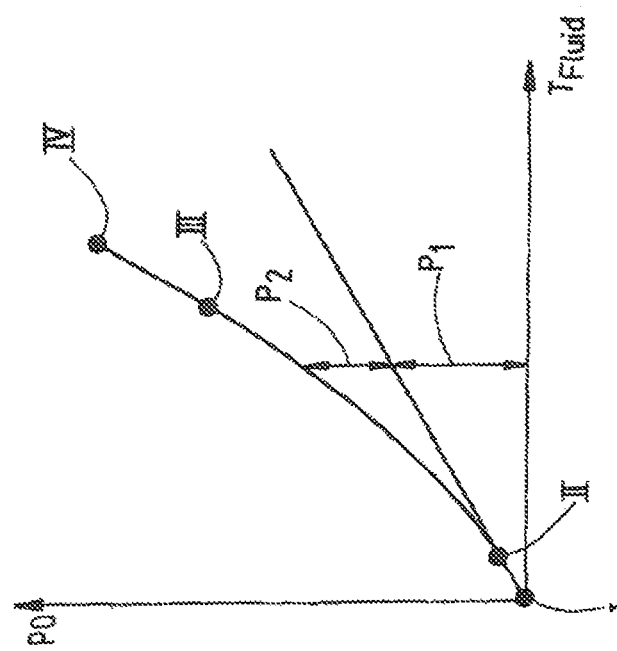
FIG. 3 is a system pressure-temperature graph of a valve according to the invention.

FIG. 6 shows an operating state, in which the system pressure $P_0$ has increased to a value, which corresponds to an overload state. The pressure, which prevails here in the fluid chamber 26 and is exerted on the control piston 30, generates a piston force that is directed towards the left, as depicted in FIG. 6, of an intensity, at which the stop element 48 (see FIG. 1) of the piston is brought into full contact with the choke piston 50. In other words, stop element 48 rests against the choke piston 50 so that the pressure is exerted on the actuating element 64 via the choke piston 5 and is therefore exerted on the thermal element 62. An overload of the thermal element 62 is avoided, however, in that the additional spring 68, which supports the thermal element 62, serves as an overload protection, which allows a yielding movement of the thermal element 62. At the same time, in the case that the position of the control piston 30 corresponds to the overload state, the P-A connection on the valve housing 12 is virtually un-choked, so that for a pressure cut-off, the piston 88 of the actuating cylinder 86 is moved to move the pivot angle SW of the actuating pump 98 in the direction of a minimum displacement volume. As a pressure cut-off is created. In FIG. 3, the working point in the case that an overload state is reached is indicated as IV on the pressure-temperature characteristic curve.

FIGS. 7 through 9 show a second exemplary embodiment. This second exemplary embodiment differs from the first in that an internal fluid feed is provided in the valve housing 12 via a fluid line 27 from the supply connection P to the port 22 on the thermal element 62, and from port 22, via a return line 29, to the second connection line 78, and therefore to the tank connection T. Since, in this way, an internal flushing fluid line is provided for the fluid, which defines the temperature of the thermal element, the thermal element can be omitted on the external port 22, as is shown in the drawing. In this respect, the internal fluid connection represents an alternative to the external port in the event that the fan drive is desired to be operated in a completely self-sufficient manner. The internal fluid line 27 is connected to the supply connection P via an input choke 31. A second input choke 33 is located between the supply connection P and the fluid chamber, which second input choke is adjacent to the piston component 38. A further difference as compared to the first example is that a separation of the control fluid and actuating fluid is formed behind the supply connection P in that the control piston 30 has an intermediary piston component 35 between the piston component 38 at the end and the piston component 36. This intermediary piston component has the same effective piston surface as the piston component 36. A fluid branch 37, which branches off from the supply connection P, discharges into the fluid chamber 26 between the piston component 36 and the intermediary piston component 35. Because of this separation between the control pressure, which is operative in the fluid chamber 26 as a control force on the control piston 30, and the actuating pressure, which is exerted at the working connection A via the fluid branch 37 that branches off, in a manner that is controlled by the piston component 36, the possibility to work with a control pressure, which falls below the required minimum actuating pressure of the adjustment cylinder 86, is made available. A correspondingly lower control pressure having lower required spring rates at the control piston 30 allows for a low control oil consumption, and to this extent, a reduced loss in the level of efficiency at the control valve.

Apart from that, the manner in which the second exemplary embodiment functions corresponds to that of the first exemplary embodiment, so that this function need not be addressed in greater detail here.

While various embodiments have been chosen to illustrate the invention, it will be understood by those skilled in the art that various changes and modifications can be made therein without departing from the scope of the invention as defined in the claims.

The invention claimed is:

1. A valve for temperature-dependent control of a hydraulic load, the valve comprising:
   a valve housing a tank connection, a working connection and a supply connection;
   a control piston controlling of said connections, being movably disposed in said valve housing and being movable by a control pressure prevailing at said supply connection;
   an energy store in said valve housing and applying a preloaded force to said control piston;
   a thermal element being suppliable with a fluid at a specifiable temperature and being actively coupled to said control piston, said thermal element interacting with said energy store such that said thermal element causes a temperature-dependent change in the preloaded force applied to said control piston by said energy store; and
   a choke piston movable in said valve housing by a temperature-dependent travel movement of said thermal element, said choke piston opening an outlet cross section between said supply connection and said tank connection as a function to the travel movement, said outlet cross section increasing in size with rising temperature, said choke piston resting against an actuating element extending from said thermal element on one side of said choke piston, said choke piston resting against said energy store on an opposite side of said choke piston to generate the preloaded force.

2. A valve according to claim 1 wherein
said energy store is a compression spring.

3. A valve according to claim 1 wherein
an input choke is provided in fluid communication with said supply connection to choke fluid flow via said supply connection.

4. A valve according to claim 1 wherein
said thermal element is supported on an end remote from said control piston by an overload element.

5. A valve according to claim 4 wherein
said overload element is a compression spring.

6. A valve according to claim 1 wherein
said control piston comprises a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches.

7. A valve according to claim 6 wherein
a connection line extends and provides fluid communication between said first fluid chamber and said choke piston in said valve housing;
a branch line extends and provides fluid communication between said choke piston and said tank connection in said valve housing; and
said choke position controls fluid passage between said connection line and said branch line.

8. A valve according to claim 1 wherein
a fluid path extends between external fluid ports in said valve housing for fluid defining a temperature of said thermal element, said thermal element being in said fluid path.

9. A valve according to claim 1 wherein
a first fluid port in said housing supplies fluid defining a temperature of said thermal element; and
a fluid line in said valve housing opens on said thermal element, said fluid line extending between said first fluid port and said supply connection and providing fluid communication between said first fluid port and said supply connection.

10. A hydraulic system, comprising:
a hydraulic load;
a valve controlling fluid flow to said hydraulic load dependent on fluid temperature, the valve including
   a valve housing a tank connection, a working connection connected to said hydraulic load and a supply connection,
   a control piston controlling connecting of said connections, being movably disposed in said valve housing and being movable by a control pressure prevailing at said supply connection, said control piston including a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches,
   an energy store in said valve housing and applying a preloaded force to said control piston,
   a thermal element being suppliable with a fluid at a specifiable temperature and being actively coupled to said control piston, said thermal element interacting with said energy store such that said thermal element causes a temperature-dependent change in the preloaded force applied to said control piston by said energy store, and
a motor pump unit connected to said hydraulic load, said motor pump unit having a variable displacement pump and a hydraulic motor, said hydraulic load influencing a displacement volume of said variable displacement pump via a back coupling of an operating pressure at said working connection with said hydraulic load predetermining a pivot angle of said variable displacement pump, said hydraulic load including an actuating cylinder that predetermines the pivot angle of said variable displacement pump, said actuating cylinder having a piston chamber connected in fluid communication with said working connection and having a rod chamber connected in fluid communication to a pressure side of said variable displacement pump, said variable displacement pump regulating system pressure, said system pressure functioning as a control pressure in said first fluid chamber of said valve via said supply connection; and movement of said control piston in said housing opening and closing fluid communication between said supply connection and said working connection according to a temperature of said thermal element.

11. A hydraulic system according to claim 10 wherein said hydraulic motor drives a fan cooling an adjacent heat exchanger connected in a hydraulic circuit.

12. A hydraulic system according to claim 10 wherein said valve is provided with a control pressure and an actuating pressure to obtain lower required control pressures.

13. A hydraulic system according to claim 10 wherein a choke piston is movable in said valve housing by a temperature-dependent travel movement of said thermal element, said choke piston opening an outlet cross section between said supply connection and said tank connection as a function to the travel movement, said outlet cross section increasing in size with rising temperature.

14. A hydraulic system according to claim 13 wherein said choke piston rests against an actuating element extending from said thermal element on one side of said choke piston and rests against said energy store on an opposite side of said choke piston to generate the preloaded force.

15. A hydraulic system according to claim 13 wherein said control piston comprises a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches.

16. A hydraulic system according to claim 15 wherein a connection line extends and provides fluid communication between said first fluid chamber and said choke piston in said valve housing;

a branch line extends and provides fluid communication between said choke piston and said tank connection in said valve housing; and said choke position controls fluid passage between said connection line and said branch line.

17. A valve for temperature-dependent control of a hydraulic load, the valve comprising:

a valve housing a tank connection, a working connection and a supply connection;

a control piston controlling of said connections, being movably disposed in said valve housing and being movable by a control pressure prevailing at said supply connection, said control piston including a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches;

an energy store in said valve housing and applying a preloaded force to said control piston;

a thermal element being suppliable with a fluid at a specifiable temperature and being actively coupled to said control piston, said thermal element interacting with said energy store such that said thermal element causes a temperature-dependent change in the preloaded force applied to said control piston by said energy store; and a choke piston movable in said valve housing by a temperature-dependent travel movement of said thermal element, said choke piston opening an outlet cross section between said supply connection and said tank connection as a function to the travel movement, said outlet cross section increasing in size with rising temperature.

18. A valve according to claim 17 wherein said choke piston rests against an actuating element extending from said thermal element on one side of said choke piston and rests against a said energy store on an opposite side of said choke piston to generate the preloaded force.

19. A valve according to claim 17 wherein a connection line extends and provides fluid communication between said first fluid chamber and said choke piston in said valve housing;

a branch line extends and provides fluid communication between said choke piston and said tank connection in said valve housing; and said choke position controls fluid passage between said connection line and said branch line.

20. A hydraulic system, comprising:

a hydraulic load;

a valve controlling fluid flow to said hydraulic load dependent on fluid temperature, the valve including a valve housing a tank connection, a working connection connected to said hydraulic load and a supply connection, a control piston controlling connecting of said connections, being movably disposed in said valve housing and being movable by a control pressure prevailing at said supply connection, an energy store in said valve housing and applying a preloaded force to said control piston, a thermal element being suppliable with a fluid at a specifiable temperature and being actively coupled to said control piston, said thermal element interacting with said energy store such that said thermal element causes a temperature-dependent change in the preloaded force applied to said control piston by said energy store, and a choke piston movable in said valve housing by a temperature-dependent travel movement of said thermal element, said choke piston opening an outlet cross section between said supply connection and said tank connection as a function to the travel movement, said outlet cross section increasing in size with rising temperature, said choke piston resting against an actuating element extending from said thermal element on one side of said choke piston and resting against said energy store on an opposite side of said choke piston to generate the preloaded force; and movement of said control piston in said housing opening and closing fluid communication between said supply connection and said working connection according to a temperature of said thermal element.

21. A hydraulic system according to claim 20 wherein said control piston comprises a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches.

22. A hydraulic system according to claim 21 wherein a connection line extends and provides fluid communication between said first fluid chamber and said choke piston in said valve housing;
a branch line extends and provides fluid communication between said choke piston and said tank connection in said valve housing; and
said choke position controls fluid passage between said connection line and said branch line.

23. A hydraulic system, comprising:
a hydraulic load;
a valve controlling fluid flow to said hydraulic load dependent on fluid temperature, the valve including
a valve housing a tank connection, a working connection connected to said hydraulic load and a supply connection,
a control piston controlling connecting of said connections, being movably disposed in said valve housing and being movable by a control pressure prevailing at said supply connection, said control piston including a main piston component and a second piston component being differential pistons on a joint piston rod, said piston components having effective piston surfaces of different sizes and delimiting a first fluid chamber therebetween, said supply connection discharging into said first fluid chamber, said main piston component controlling an outlet cross section between said first fluid chamber and said working connection with at least one of control edges or control notches,
an energy store in said valve housing and applying a preloaded force to said control piston,
a thermal element being suppliable with a fluid at a specifiable temperature and being actively coupled to said control piston, said thermal element interacting with said energy store such that said thermal element causes a temperature-dependent change in the preloaded force applied to said control piston by said energy store, and
a choke piston movable in said valve housing by a temperature-dependent travel movement of said thermal element, said choke piston opening an outlet cross section between said supply connection and said tank connection as a function to the travel movement, said outlet cross section increasing in size with rising temperature; and movement of said control piston in said housing opening and closing fluid communication between said supply connection and said working connection according to a temperature of said thermal element.

24. A hydraulic system according to claim 23 wherein a connection line extends and provides fluid communication between said first fluid chamber and said choke piston in said valve housing;
a branch line extends and provides fluid communication between said choke piston and said tank connection in said valve housing; and
said choke position controls fluid passage between said connection line and said branch line.

25. A hydraulic system, comprising:
a hydraulic load;
a valve controlling fluid flow to said hydraulic load dependent on fluid temperature, the valve including
a valve housing a tank connection, a working connection connected to said hydraulic load and a supply connection,
a control piston controlling connecting of said connections, being movably disposed in said valve housing and being movable by a control pressure prevailing at said supply connection,
an energy store in said valve housing and applying a preloaded force to said control piston,
a thermal element being suppliable with a fluid at a specifiable temperature and being actively coupled to said control piston, said thermal element interacting with said energy store such that said thermal element causes a temperature-dependent change in the preloaded force applied to said control piston by said energy store, and
a choke piston movable in said valve housing by a temperature-dependent travel movement of said thermal element, said choke piston opening an outlet cross section between said supply connection and said tank connection as a function to the travel movement, said outlet cross section increasing in size with rising temperature, said control piston and said choke piston being movable relative to each other; and movement of said control piston in said housing opening and closing fluid communication between said supply connection and said working connection according to a temperature of said thermal element.

26. A valve for temperature-dependent control of a hydraulic load, the valve comprising:
a valve housing a tank connection, a working connection and a supply connection;
a control piston controlling of said connections, being movably disposed in said valve housing and being movable by a control pressure prevailing at said supply connection;
an energy store in said valve housing and applying a preloaded force to said control piston;
a thermal element being suppliable with a fluid at a specifiable temperature and being actively coupled to said control piston, said thermal element interacting with said energy store such that said thermal element causes a temperature-dependent change in the preloaded force applied to said control piston by said energy store; and
a choke piston movable in said valve housing by a temperature-dependent travel movement of said thermal element, said choke piston opening an outlet cross section between said supply connection and said tank connection as a function to the travel movement, said outlet cross section increasing in size with rising temperature, said control piston and said choke piston being movable relative to one another.

\* \* \* \* \*